Feb. 7, 1961   A. L. CROSBY ET AL   2,970,683
ARTICLE HANDLING APPARATUS
Filed July 2, 1959   4 Sheets-Sheet 3

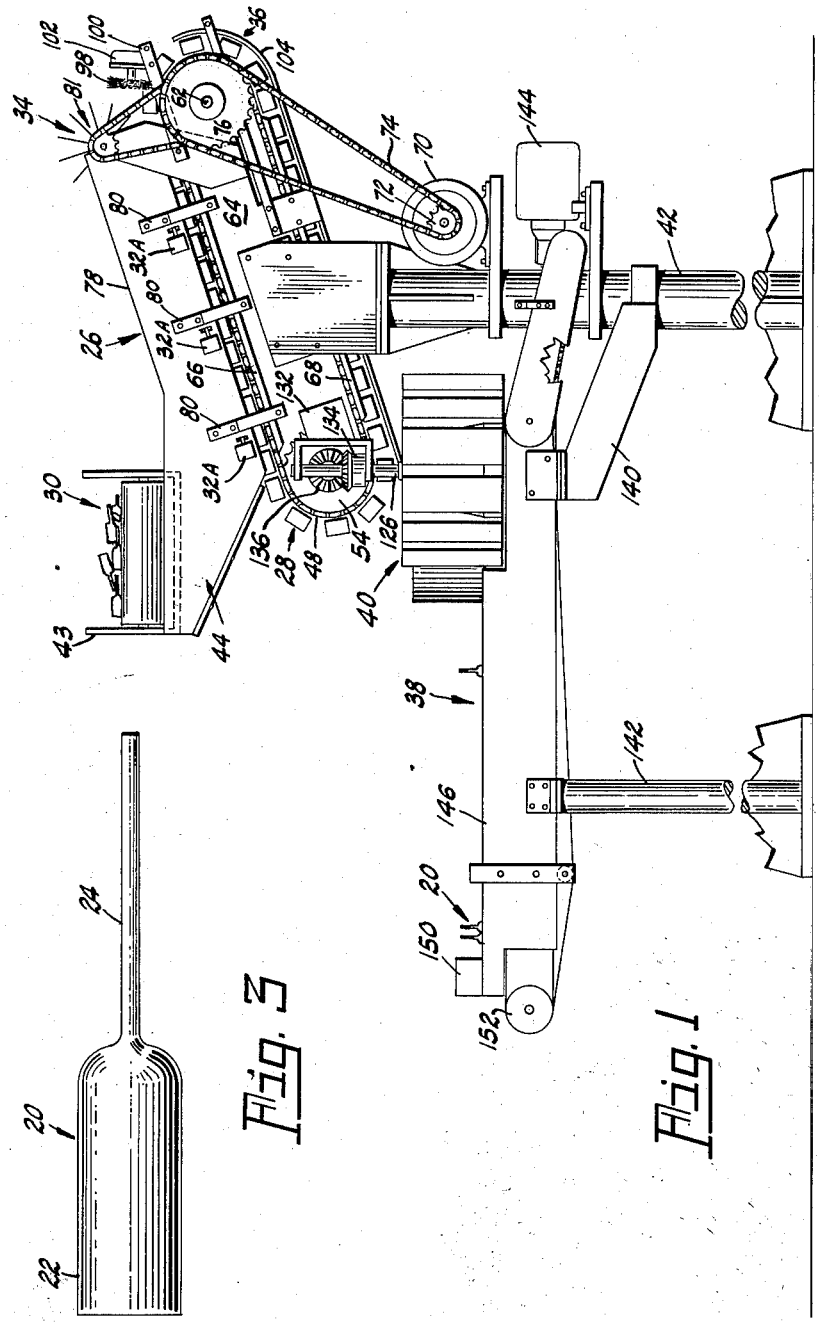

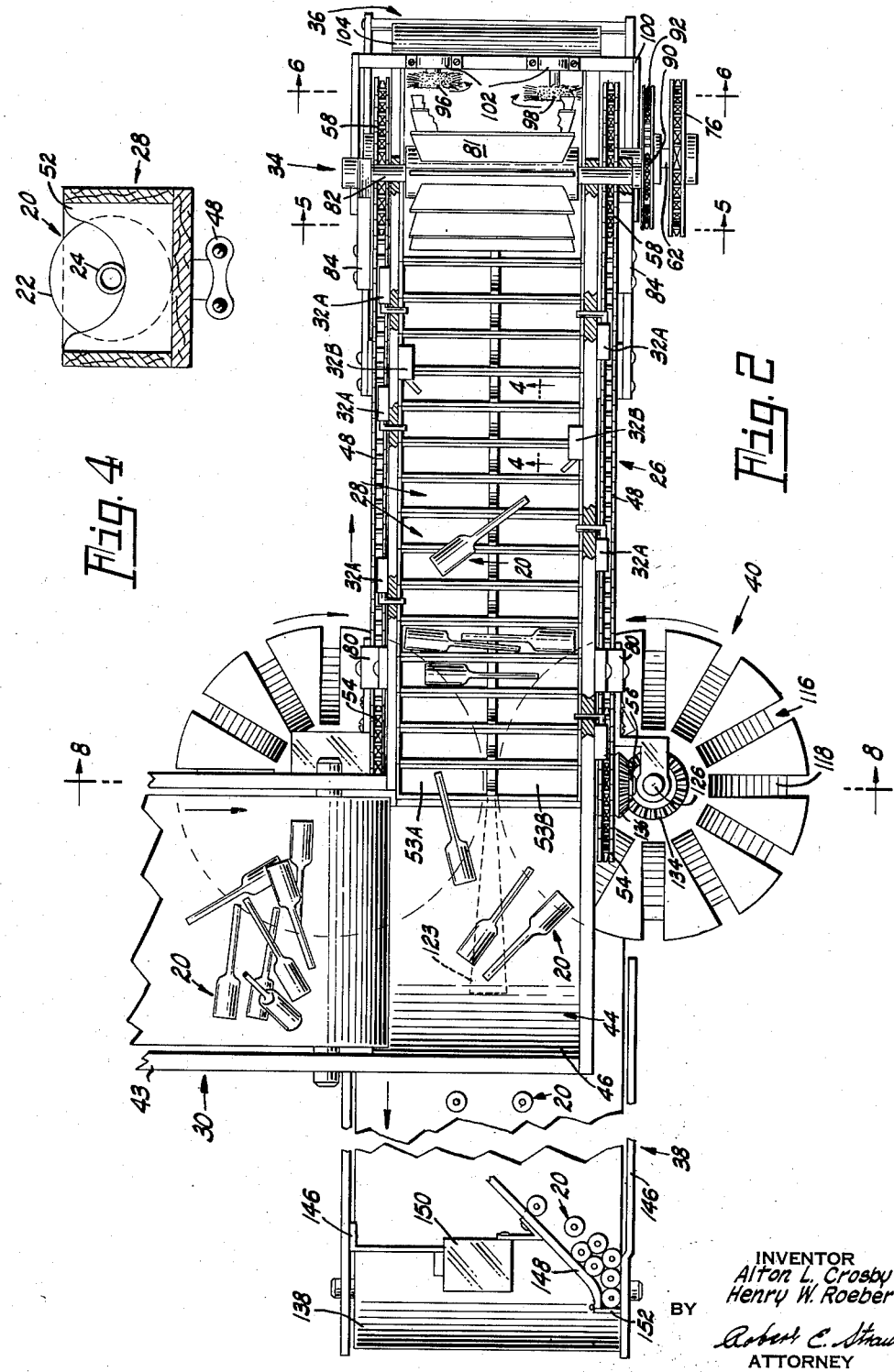

INVENTOR
Alton L. Crosby
Henry W. Roeber
BY
Robert C. Strausser
ATTORNEY

INVENTOR
Alton L. Crosby
Henry W. Roeber
BY
Robert C. Strausser
ATTORNEY

United States Patent Office 2,970,683
Patented Feb. 7, 1961

2,970,683
ARTICLE HANDLING APPARATUS

Alton L. Crosby, Austin, and Henry W. Roeber, Emporium, Pa., assignors to Sylvania Electric Products Inc., a corporation of Delaware Filed July 2, 1959, Ser. No. 824,495

6 Claims. (Cl. 198—33)

This invention relates to article handling apparatus and more particularly to apparatus for aligning and erecting tubulated envelopes used in the production of electron discharge devices comprising an electrode structure contained within a sealed and exhausted enclosure.

In the manufacture of some types of discharge devices, such as radio receiving tubes, the electrode structure is first attached to a header comprising a plurality of lead-in wires passing through and sealed to a glass wafer. Subsequently, an envelope is slipped over the electrode structure and sealed to the wafer by automatic machinery. This envelope-wafer structure is then evacuated and sealed.

The tubulated envelope comprises an elongated tubulation joined to a bulb portion that surrounds the electrode structure and which is sealed to the wafer. The tube is exhausted through this tubulation which is then heated to the softening point of the material at a point adjacent the bulb and tipped-off. This tipping-off consists of pinching the tubulation closed while heated and may be accomplished by various means which are not part of the present invention.

The envelope and tubulation may be fabricated from glass by various methods on automatic equipment. The output of these tubulated envelope forming machines is gathered in large hampers for storage and for transportation to the point of use. Prior to this invention, it was necessary for the operator at the sealing machine to handle and position each and every individual tubulated envelope. The operator had to reach into the hamper, select an undamaged tubulated envelope, erect it and place it over the header-mounted electrode structure held in the sealing machine. This was disadvantageous since the operative rate of the sealing machine was thus tied in part to the speed and agility of the operator. Therefore, it is an object of this invention to erect and align tubulated envelopes, taken from an unoriented mass of envelopes, at an increased rate. It is another object of this invention to reduce the amount of operator supervision required for the pre-positioning of tubulated envelopes for subsequent use.

Since many of the tubulated envelopes are fabricated from glass, the operator who manually positioned them was subject to possible injury due to contact with broken envelopes or fragments of scrap glass in the storage hamper. Therefore, it is another object of this invention to reduce the possibility of operator injury due to manual contact with broken tubulated envelopes or fragments thereof.

The foregoing objects are achieved in one aspect of the invention by the provision of an apparatus for orienting and erecting tubulated envelopes including the combination of an upwardly inclined endless conveyor, means for supplying a plurality of unoriented envelopes to the conveyor mounted adjacent the beginning of the upward traversal path of the conveyor, means for aligning the envelopes on the conveyor in serial array, means for removing unaligned envelopes from said carriers, means for retaining the envelopes on the conveyor mounted adjacent the downward traversal path of the conveyor, envelope storage means positioned beneath the conveyor, and means synchronized with the conveyor and positioned at the end of the downward path of the conveyor for erecting the envelopes and delivering the envelopes to the storage means.

For a better understanding of the invention, reference is made to the following description taken in conjunction with the accompanying drawings in which:

Fig. 1 is a side elevation of the apparatus with some parts broken away and with other parts omitted in the interests of simplicity and clarity;

Fig. 2 is a plan view of the apparatus of Fig. 1;

Fig. 3 illustrates a typical tubulated envelope showing the tubulation joined to the bulb portion;

Fig. 4 is a view taken along the line 4—4 of Fig. 2 showing an envelope in a carrier;

Figure 5:
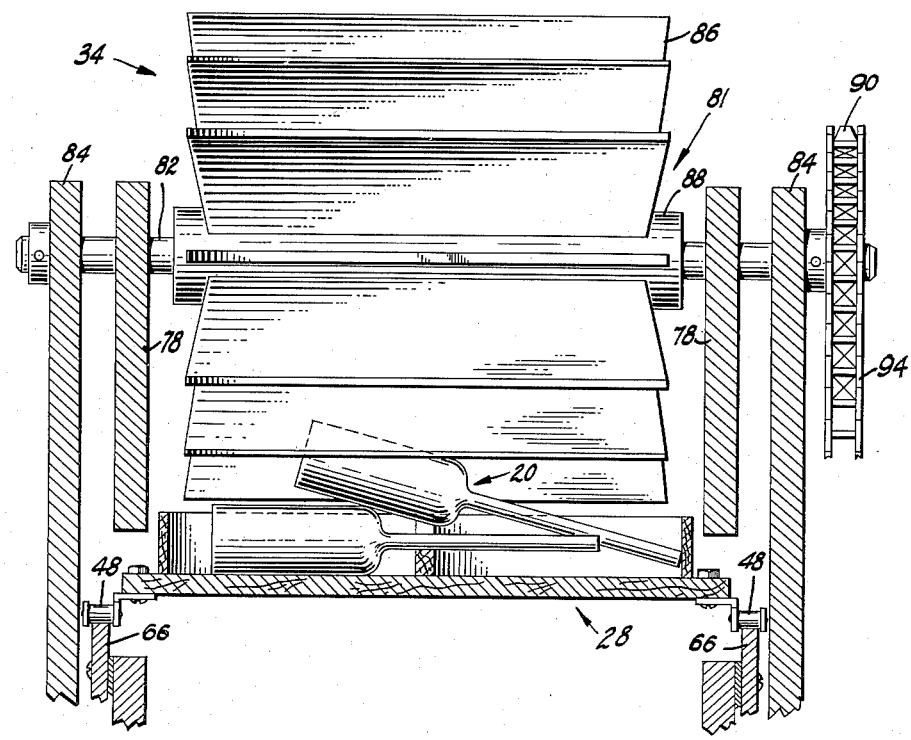
Fig. 5 is a view taken along the line 5—5 of Fig. 2 showing the relationship of the inclined conveyor and the paddle wheel.

Referring to Figs. 1, 2 and 3, the tubulated envelope 20 comprises a bulb portion 22 with a given diameter which has an elongated tubulation 24 of a smaller diameter joined to it. The envelope aligning and erecting apparatus includes an upwardly inclined sorting conveyor 26 which has a plurality of carriers 28 for the tubulated envelopes 20. Unoriented envelopes are supplied to the sorting conveyor by a horizontal conveyor or supply means 30. As the tubulated envelopes are carried up the inclined sorting conveyor 26 air streams from the air jets 32A, 32B align the envelopes 20 in the carriers. Excess or unaligned envelopes are removed from the carriers by deflector means 34, astride the conveyor and spaced therefrom. The envelopes are retained in the carriers by guide means 36 as the carriers start on the downward traversal path of the conveyor. An accumulator or storage conveyor 38 is positioned beneath the sorting conveyor for storing the erected envelopes until used. The envelopes which have been aligned in the carriers are delivered to the envelope erecting means 40 positioned between the inclined conveyor 26 and the storage conveyor 38 where they are erected and delivered to the storage means.

The envelope supply means or delivery conveyor 30 is an endless belt type conveyor, driven by a motor, not shown, and is supported in part by the sorting conveyor 26. The sorting conveyor is in turn supported by a floor mounted standard 42. Envelopes which are placed on the supply conveyor 30 are confined thereon by the side walls 43. A hopper 44 is positioned beneath the supply conveyor and above the sorting conveyor to receive the envelopes from the supply conveyor and transfer the envelopes to the lowermost portion of the sorting conveyor. The side walls and bottom of the hopper are lined with a shock absorbing material 46. The inclined bottom portion of the hopper terminates at a position adjacent the carriers of the sorting conveyor.

Figure 6:
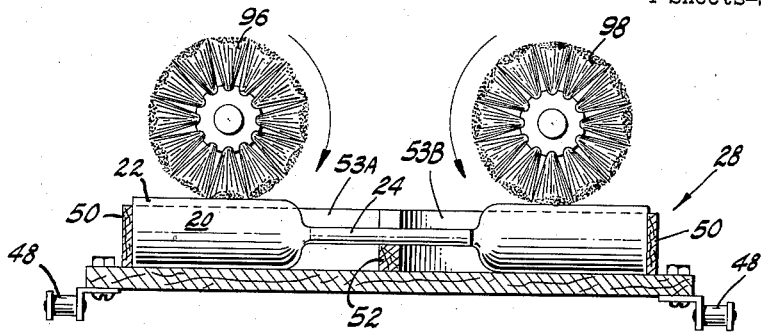
Fig. 6 is a view taken along the line 6—6 of Fig. 2 showing the supplementary envelope positioning means.

Referring to Fig. 6, the sorting conveyor comprises a plurality of closely spaced carriers 28 each affixed to the sprocket chains 48. The carriers are fabricated from suitable materials such as wood or plastic. They are provided with end walls 50 and a contoured central partition 52 which divides each carrier into two compartments 53A, 53B. The function of this partition 52 will be explained later.

Sprocket chains 48 are each opeartively connected between sprockets 54 affixed to a shaft 56 at the lowermost end of the conveyor and sprockets 58 affixed to a shaft 62 at the uppermost end of the conveyor. Shafts 56 and 62 are journaled in the side frames 64 of the conveyor. Although a conveyor tensioning means, not shown, is provided each of the side chains is guided on both the upward and downward traversals of the conveyor by tracks 66, 68 on which they ride, to insure proper positioning. The tracks are affixed to the conveyor side frames 64. The conveyor is chain driven by a motor 70 supported on the standard 42. A sprocket 72 is affixed to the motor shaft and is connected by a chain 74 to a second sprocket 76 affixed to the shaft 62 on the conveyor.

The side frames 64 of the inclined conveyor also support the conveyor side plates 78, which are contiguous with the wall of the hopper 44. The sides 78 of the conveyor are held to the frame by straps 80. Transverse air jet means 32A are mounted on the exterior of the conveyor sides 78 with their air stream directing portion passing therethrough while the downwardly directed air jets 32B are mounted on the inward side of the plates.

The excess or unaligned envelopes removing means 34 comprise a paddle wheel 81, supported by a shaft 82 which passes through the sides of the conveyor and is journaled in a support 84 fastened to the side plates. The paddle wheel 81 comprises a plurality of semi-flexible blades 86 of rubber or the like affixed to a cylindrical hub 88 fastened to the shaft 82 (see Fig. 5). The direction of rotation of the paddle wheel is opposed to the direction of the movement of the conveyor. The paddle wheel is driven by a conveyor 26 through a sprocket 90 affixed to the paddle wheel shaft 82, sprocket 92 affixed to the shaft 62 on the conveyor, and linking chain 94.

Supplementary envelope alignment in the compartments of the carrier 28 is provided by a pair of spaced contra-rotating brushes 96, 98 which are mounted on a frame 100 attached to the paddle wheel support 84. In the embodiment shown, each of the brushes is driven by its own motor 102.

Figure 7:
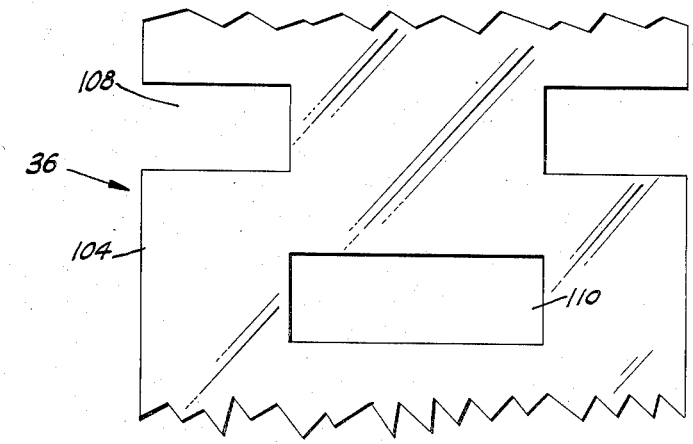
Fig. 7 is a plan view of a fragment of the retaining plate used to retain the envelopes in the carriers when the carriers are inverted.

The envelope guide means 36 includes a retaining plate 104 which is supported by the side frames of the inclined conveyor through brackets 106. The plate is fitted closely to the downward traversal path of the carriers on the conveyor, as controlled by the tracks 68. Referring to Fig. 7 the plate 104 is provided with a series of cutouts 108, 110 whose function will be later explained. One end of the retaining plate is located above the erecting means 40.

Figure 8:
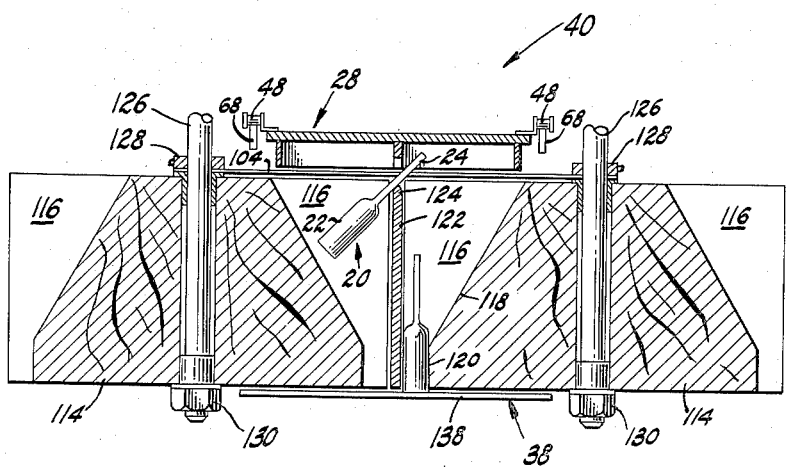
Fig. 8 is an end view in cross section of the apparatus of Fig. 2 taken along the line 8—8 of Fig. 2 showing the envelope erecting wheels.

Referring to Figs. 1, 2 and 8 the erecting means 40 comprises a pair of horizontally spaced oppositely rotating wheels 114 having their axis of rotation parallel. In the embodiment shown they are fabricated from laminated wood. Each of the wheels 114 is provided with a plurality of radial article receiving recesses 116 in their periphery. Each of the recesses 116 is provided with an inclined inner surface 118 which extends from the upper surface of the wheel to a point above the bottom surface of the wheel. At that point a straight sided portion 120, substantially parallel to the axis of the wheel, is formed. The straight sided portion 120 in cooperation with a divider plate 122 positioned between the wheels forms a pocket which approximates the diameter of the bulb portion of the envelope being processed. The divider plate is supported above the storage conveyor 38 by a bracket attached to the retaining plate and has a wedge shaped envelope separating extension 123. The upper end 124 of the divider plate is rounded. The function of this divider plate will be more fully explained during the description of the operation of the apparatus.

Referring to Fig. 8, each of the erecting wheels 114 is clamped to the rotatable shaft 126 between a collar 128 and a nut 130 which engages the threaded end of the shaft. Sufficient clamping force is applied so that each wheel will rotate as a unit with its shaft. Each shaft 126 is held and journaled in a support 132 which is affixed to the apparatus side frame 64. A miter gear 134 attached to the shaft 126 meshes with a miter gear 136 affixed to the lowermost shaft 56 on the inclined conveyor. Thus the wheels 114 are driven by and synchronized with the movement of the inclined conveyor.

The erected envelope storage means 38 comprises a smooth surfaced endless conveyor belt 138 which is supported at one end by a bracket 140 affixed to the standard 42 and supported at its other end by a second standard 142. The conveyor 138 is driven by a motor 144 which is affixed to the standard 42. The envelope storage or accumulator conveyor 38 is equipped with raised sides 146 which prevent the erected envelopes from falling from the conveyor. Guide rail 148 is positioned across the conveyor, above the belt 138, at an angle to the path of the erected envelopes as they are moved by the conveyor. This guide rail causes the envelopes exiting from the erecting means to form a single line between the guide rail and the wall 146 of the conveyor. A vibrator 150, affixed to one of the side walls 146 of the storage conveyor, agitates the guide rail 148 thus preventing envelopes from becoming jammed agianst the rail. Gate means 152 are provided to retain the erected envelopes on the storage conveyor in position until needed.

In operation, a plurality of unaligned tubulated envelopes 20 are placed on the supply conveyor 30. This conveyor is driven by a motor, not shown, at a relatively low rate of speed. As the randomly oriented mass of envelopes is carried slowly forward, those which come to the end of the conveyor 30 drop a short distance into the hopper 44.

As previously described the inclined sorting conveyor 26 is driven by the motor 70 supported on the standard 42. As the closely spaced carriers 28 pass beneath the bottom edge of the hopper, the tubulated envelopes 20 from the hopper 44 are carried upwardly by the carriers. The envelopes are indiscriminately arrayed upon the carriers with some dropping haphazardly into the compartments 53A, 53B formed in the carriers 28.

The envelopes must be presented to the erecting means 40 in an aligned position. The envelopes are positioned in a serial array with their tabulations 24 parallel. The alignment further comprises having the open end of the bulb portion 22 of each envelope adjacent the end wall 50 of the carrier 28. When the envelopes are in this position in the compartments 53A, 53B of the carrier, their tubulations lie across the contoured carrier divider 52. The configuration of the divider centralizes the envelope in the compartment so that the longitudinal axis of the envelope is substantially parallel to the axis of the carrier 28 and thus transverse to the direction of movement or the traversal path of the conveyor 26. Since the carriers are held horizontal and substantially parallel to one another by the chain 48 and guide track 66, the compartmented envelopes will also assume this position relative to one another.

As the unaligned tubulated envelopes are carried up the conveyor 26 the air streams from the air jets 32A, 32B substantially align the envelopes and cause those which are not at least partially seated in a compartment of a carrier to be blown down the incline of the conveyor 26 to the starting position at the hopper 44. Lateral thrust against the bulb portion 22 of the tubulated envelopes 20 is produced by the transverse air jets 32A to align the envelopes in the carriers 28 as aforementioned. The downwardly inclined air jets 32B cause the unaligned or unseated envelopes to return to the start of the conveyor 26. While the carriers employed in the embodiment of the invention shown have two compartments, 53A, 53B each, it is not necessary for the proper functioning of the apparatus that either or both compartments be filled on every carrier.

Referring to Fig. 5, those envelopes which have not been removed or aligned in the compartments 53A, 53B of the carrier 28 by the air jets 32A, 32B are contacted by the paddle wheel 81 as their carrier 28 passes beneath it. Since the direction of the rotation of the paddle wheel 81 is opposed to the direction movement of the carriers on the conveyor 26 those envelopes whose bulb portion 22 or tubulation 24 extend above the wall of the carrier due to improper orientation or alignment will be pushed or deflected from the carrier by the paddle wheel. If they do not drop into an unoccupied compartment they will be moved repeatedly by the paddle wheel 81. If they drop down the conveyor 26 far enough they will encounter the air streams from the air jets 32B and possibly be blown entirely back to the starting position at the hopper 44.

Those envelopes which remain in the carrier 28 after passing beneath the paddle wheel 81 are thus substantially aligned in the compartments 53A, 53B formed in the carriers. However, to insure the proper placement of the envelopes in the compartments supplementary aligning means may be provided. As the carrier containing the bulbs passes beneath the contra-rotating brushes 96, 98 the open end of bulb portions 22 are seated outermost in the carrier against the walls 50. After having passed beneath the brushes the carriers ride over the end of the conveyor and begin their inverted descent.

As the carriers pass over the end of the conveyor 26 and become inverted the retaining plate or envelope guide 104 retains the envelopes 20 within the compartment 53A, 53B in which they are aligned. Cut-out portions 108, 110 in the plate, as shown in Fig. 7, are provided to allow fragments of scrap glass or broken tubulated envelopes to drop from the conveyor 26. Those envelopes which are complete will bridge the openings and thus be retained in their compartment.

The erecting wheels 114 are driven by and thus synchronized with the inclined conveyor 26 and as an envelope containing carrier 28 reaches the end of the retaining plate 104 the envelope receiving recesses 116 on the wheels positioned beneath the end of the plate are simultaneously aligned therewith to receive the envelopes 20 as they drop from the carrier 28. An envelope receiving pocket is formed by each of the wheel recesses 116 and the central divider plate 122. As the envelopes fall from the carriers their tubulation 24 strikes the rounded top 124 of the divider plate, which causes the bulb portion 22 to descend first and become the first part of the envelope 20 to contact the erecting wheel 114. The bulb portion 22 encounters the inclined inner wall 118 of the recesses 116 and slides down until it comes to rest on the storage conveyor 138 beneath the pocket. The envelope 20 is kept from tipping over by the walls of the pocket formed by the recess 116 and divider plate 124. The rate of rotation of the wheels 114 (peripheral speed) and the lineal speed of the storage conveyor 138 are matched so that as the wheels rotate the erected envelopes move at the same speed on the storage conveyor 138. As the wheels 114 rotate the pockets formed by the recesses 116 wheel and the divider plate are opened allowing the erected envelopes 20 on the storage conveyor 138 to be carried outwardly away from the erecting means 40. As the closely spaced envelopes are carried from the erecting means by the storage conveyor, they encounter the dividing wedge 123 attached to the plate. This forces the bulbs to slide gradually apart as they are carried by the conveyor 138 so that they become spaced from one another transverse to the conveyor. As the erected envelopes continue along the storage conveyor 138 they encounter the vibrating guide rail 148 and are shifted to a single line between the guide rail 148 and side 146 of one conveyor and then are arrested by the gate means 152. Sufficient room is provided on the accumulator conveyor 38 so that a plurality of envelopes 20 may be stored there. The arrested envelopes drag on the conveyor belt 138, but since it has a smooth surface and operates at a low speed they are not tipped over.

The single file alignment of erected tubulated envelopes thus produced allows the use of automatic handling equipment, not shown, for placing the erected envelopes over header mounted electrode structure held in an automatic sealing machine.

Although several embodiments of the invention have been shown and described, it will be apparent to those skilled in the art that various changes and modifications may be made therein without departing from the scope of the invention as defined by the appended claims.

What is claimed is:

1. In an apparatus for aligning and erecting tubulated envelopes for use in the production of electron discharge devices the combination of an inclined tubulated envelope conveyor including a plurality of horizontal compartmented carriers for tubulated envelopes mounted for upright and inverted movement, means for supplying unoriented tubulated envelopes to said conveyor at the lowermost end thereof, means for aligning said tubulated envelopes in said compartments intermediate the upper and lower ends of said conveyor, means for removing unaligned envelopes from said carriers at said upper end of said conveyor, means to retain said aligned envelopes in said compartments when said carrier is inverted by said conveyor, means to store a plurality of said envelopes in an erected position, and means to receive said aligned envelopes from said inverted carrier, erect said envelopes and deliver said envelopes to said erected envelope storage means.

2. In an apparatus for aligning and erecting tubulated envelopes for use in the production of electron discharge devices the combination of an inclined tubulated envelope conveyor including a plurality of horizontal compartmented carriers for tubulated envelopes mounted for upright and inverted movement, means for supplying unoriented tubulated envelopes to said conveyor at the lowermost end thereof, means for substantially aligning said tubulated envelopes in said compartments intermediate the upper and lower ends of said conveyor, means for removing unaligned envelopes from said carriers at said upper end of said conveyor, supplementary means for finally positioning said envelopes in said compartments, means to retain said aligned envelopes in said compartments when said carrier is inverted by said conveyor, means to store a plurality of said envelopes in an erected position, and means to receive said aligned envelopes from said inverted carrier, erect said envelopes and deliver said envelopes to said erected envelope storage means.

3. In an apparatus for aligning and erecting tubulated envelopes for use in the production of electron discharge devices the combination of an inclined tubulated envelope conveyor including a plurality of horizontal compartmented carriers for tubulated envelopes mounted for upright and inverted movement, means for supplying unoriented tubulated envelopes to said conveyor at the lowermost end thereof, means for substantially aligning said tubulated envelopes in said compartments including a plurality of air jets intermediate the upper and lower ends of said conveyor, means for removing unaligned envelopes from said carriers at said upper end of said conveyor including a rotatively driven paddle wheel positioned adjacent and transverse said conveyor, means to retain said aligned envelopes in said compartments when said carrier is inverted by said conveyor, means to store a plurality of said envelopes in an erected position, and means to receive said aligned envelopes from said inverted carrier, erect said envelopes and deliver said envelopes to said erected envelope storage means comprising a pair of oppositely rotating wheels synchronized with said conveyor and having a plurality of radial envelope receiving recesses formed in their periphery.

4. In an apparatus for aligning and erecting tubulated envelopes for use in production of electron discharge devices the combination of an inclined tubulated envelope conveyor including a plurality of horizontal compartmented carriers for tubulated envelopes mounted for upright and inverted movement, means for supplying unoriented tubulated envelopes to said conveyor at the lowermost end thereof, a plurality of air jets positioned adjacent said conveyor for substantially aligning said envelopes in said compartments intermediate the upper and lower ends of said conveyor, a rotatably driven paddle wheel transverse to and spaced from said conveyor for removing unaligned envelopes from said carriers at said upper end of said conveyor, supplementary means for finally positioning said envelopes in said compartments including a pair of spaced oppositely rotating brush members mounted above said conveyor in operative relation with said envelopes when in said carriers, means to retain said aligned envelopes in said compartments when said carrier is inverted by said conveyor, second conveyor means positioned beneath said inclined conveyor to store a plurality of said envelopes in an erected position, and means to receive said aligned envelopes from said inverted carrier, erect said envelopes and deliver said envelopes to said second conveyor means comprising a pair of oppositely rotating wheels synchronized with said conveyor and having a plurality of radial envelope receiving recesses formed in their periphery.

5. In an apparatus for orienting and erecting tubulated envelopes the combination of an upwardly inclined endless conveyor having a plurality of horizontal compartmented carriers for tubulated envelopes, means for supplying a plurality of unoriented envelopes to said conveyor mounted adjacent the beginning of the upward traversal path of said conveyor, means for aligning said envelopes on said conveyor in serial array, means for retaining said envelopes on said conveyor mounted adjacent the downward traversal path of said conveyor, erected envelope storage means positioned beneath said conveyor, and means synchronized with said conveyor for erecting said envelopes and delivering said erected envelopes to said storage means comprising a pair of rotating opposed wheels having a plurality of envelope receiving radially aligned recesses in their periphery, said wheels being horizontally aligned and spaced from one another.

6. In an apparatus for orienting articles having one portion of said article of a given diameter and an attached second portion of a smaller diameter having a common longitudinal axis the combination of conveyor means, means for supplying a plurality of unoriented articles to said conveyor means, means on said conveyor for orienting said articles in serial array with said longitudinal axis of each of said articles transverse to said conveyor, oriented article storage means, and means operating in synchronism with said conveyor for orienting said articles with said longitudinal axis vertical on said article storage means having a plurality of radial article orienting recesses.

References Cited in the file of this patent

UNITED STATES PATENTS

| | | |
|---|---|---|
| 2,572,164 | Lehmann | Oct. 23, 1951 |
| 2,775,334 | Jeremiah | Dec. 25, 1956 |
| 2,781,885 | Taylor | Feb. 19, 1957 |